US011269307B2

(12) United States Patent
Van Zadelhoff et al.

(10) Patent No.: US 11,269,307 B2
(45) Date of Patent: Mar. 8, 2022

(54) METHOD FOR OPERATING AN AGRICULTURAL IMPLEMENT AND ARRANGEMENT COMPRISING AN AGRICULTURAL IMPLEMENT (71) Applicant: Grimme Landmaschinenfabrik GmbH & Co. KG, Damme (DE)

(72) Inventors: Gustaaf Garrit Johan Van Zadelhoff, Damme (DE); Torsten Napierala, Salzkotten (DE); Christoph Grothaus, Melle (DE)

(73) Assignee: Grimme Landmaschinenfabrik GmbH & Co. KG

( * ) Notice: Subject to any disclaimer, the term of this patent is extended or adjusted under 35 U.S.C. 154(b) by 0 days.

(21) Appl. No.: 16/762,533

(22) PCT Filed: Nov. 8, 2018

(86) PCT No.: PCT/EP2018/080673
§ 371 (c)(1),
(2) Date: May 8, 2020

(87) PCT Pub. No.: WO2019/092139
PCT Pub. Date: May 16, 2019

(65) Prior Publication Data
US 2020/0363780 A1 Nov. 19, 2020

(30) Foreign Application Priority Data
Nov. 8, 2017 (DE) .................. 10 2017 126 122.2

(51) Int. Cl.
*G05B 19/042* (2006.01)
(52) U.S. Cl.
CPC .. *G05B 19/0423* (2013.01); *G05B 2219/2663* (2013.01)

(58) Field of Classification Search
CPC ........ G05B 19/0423; G05B 2219/2663; G05B 2219/45017
See application file for complete search history.

(56) References Cited

U.S. PATENT DOCUMENTS

| 2007/0140269 A1 | 6/2007 | Donnelli et al. |
| 2012/0001876 A1 | 1/2012 | Chervenka et al. |
| (Continued) | | |

FOREIGN PATENT DOCUMENTS

| DE | 102014211712 A1 | 2/2015 |
| DE | 102015112613 A1 | 2/2017 |
| (Continued) | | |

OTHER PUBLICATIONS

What is ISOBUS Protocol?, Embitel, Mar. 2017, ISOBUS Software Stack Solution, p. 1-4. (Year: 2017).*

(Continued)

*Primary Examiner* — Kidest Bahta
(74) *Attorney, Agent, or Firm* — Husch Blackwell LLP (57) ABSTRACT

A method for operating an agricultural implement is provided, which in particular is configured as an implement pulled by a tractor or a self-propelled implement. One or more machine parameters relevant for the operation are administered via at least one job computer arranged on the implement, and are preferably imaged by means of an interface on one of the at least two universal terminals connected in particular in a wireless and/or cabled manner. After some initial configuration phase dining operation, the at least one machine parameter is imaged simultaneously on the second universal terminal.

16 Claims, 6 Drawing Sheets (56) References Cited

U.S. PATENT DOCUMENTS

| | | | | |
|---|---|---|---|---|
| 2012/0256843 A1* | 10/2012 | Epple | ............... | A01D 41/127 |
| | | | | 345/169 |
| 2014/0195126 A1* | 7/2014 | Prickel | ............... | A01B 71/02 |
| | | | | 701/50 |
| 2014/0325419 A1 | 10/2014 | Andersen et al. | | |
| 2014/0350752 A1 | 11/2014 | Gelinske et al. | | |
| 2015/0052447 A1* | 2/2015 | Ritesh | ............... | H04L 41/22 |
| | | | | 715/740 |
| 2016/0157275 A1* | 6/2016 | Matthews | ............ | H04W 72/005 |
| | | | | 701/2 |
| 2016/0246296 A1 | 8/2016 | Gelinske et al. | | |
| 2017/0034246 A1 | 2/2017 | Sand et al. | | |
| 2017/0131959 A1* | 5/2017 | Federico | ............ | G06F 3/147 |
| 2018/0364155 A1* | 12/2018 | Thompson | ............ | G01N 21/80 |

FOREIGN PATENT DOCUMENTS

| | | |
|---|---|---|
| EP | 2798930 A2 | 11/2014 |
| FR | 3033053 A1 | 8/2016 |

OTHER PUBLICATIONS

Marvin L Stone et al., "ISO 11783: An Electronic Communications Protocol for Agricultural Equipment", Feb. 7, 1999 (Feb. 7, 1999), p. 3-17, Agricultural Equipment Technology Conference, Louisville, Kentucky.

\* cited by examiner

METHOD FOR OPERATING AN AGRICULTURAL IMPLEMENT AND ARRANGEMENT COMPRISING AN AGRICULTURAL IMPLEMENT

CROSS-REFERENCE

This application claims priority to PCT Application No. PCT/EP2018/080673, filed Nov. 8, 2018, which itself claims priority to German Application No. 10 2017 126122.2, filed Nov. 8, 2017, the entirety of both of which are hereby incorporated by reference.

BACKGROUND

The present invention relates to a method for operating an agricultural implement, which in particular is configured as an implement pulled by a tractor or a self-propelled implement, wherein one or more machine parameters relevant for the operation are administered via at least one job computer arranged on the implement and are preferably imaged by means of an interface on one of the at least two universal terminals connected in particular in a wireless and/or cabled manner. Furthermore, the invention relates to an arrangement comprising an agricultural implement as well as at least two universal terminals which can be connected to this via an interface of the job computer.

A subject matter according to the preamble of claim 1 is disclosed in US 2014/0350752 A1. Individual machine parameters which are obtained from the functions of the machine (hereinafter "machine functions") are assigned to individual universal terminals, also designated as virtual terminals (VTs) to be displayed there during operation. Whereas a first subgroup of machine parameters is assigned to a first universal terminal, a further subgroup of other machine parameters is assigned to a further terminal. Accordingly, the universal terminals each display different parameters and different operable machine functions are each operated by different universal terminal by means of the respective machine parameters. The distribution of the operation of the functions of one implement over a plurality of monitors or display units in the form of universal terminals takes account of the increasingly complex machine functions which frequently can no longer be represented clearly on one universal terminal. The universal terminals which, for example, in the case of a pulled implement are arranged on the right of the driver, can simultaneously represent a multiplicity of information which allows the operation of the machine in many respects. However, it can be confusing for the operating staff as a result of the plurality of controllable terminals and the plurality of different functions represented there.

Further known from US 2017/0131959 A1 is a conventional system with a job computer arranged on a tractor, a principle display and one or more auxiliary displays, wherein the principle display assigns to the auxiliary displays, contents or functions to be displayed thereon. The system cannot be used without the principle display.

BRIEF SUMMARY

It is the object of the present invention to simplify the operation of an agricultural implement via universal terminals.

The object is achieved by a method according to claim 1 and by an arrangement according to claim 13. Configurations according to the invention can also be deduced from the subclaims related back to these claims and from the following description.

According to the invention it is provided that after some initial configuration phase, i.e. according to the exemplary embodiment, even a configuration phase which is not present during operation, the at least one machine parameter is imaged simultaneously on the second universal terminal. The possibility of simultaneously imaging information on one machine parameter on at least two universal terminals at the same time makes it easier for the operating staff to operate the machine particularly when the two universal terminals are not arranged at the same location but at a distance from one another. Regions of a screen or display of the universal terminal having a visually identical structure, which are identically constructed at least in parts, make it easier to rapidly acquire relevant machine parameters regardless of the universal terminal used. Further regions of the screens can each be configured differently and each represent different machine parameters. In this case, this can comprise an arrangement of positions remote from one another within a driver's cab, e.g. to the left and right of the driver's seat or a positioning inside the tractor and on the implement itself, e.g. on a sorting table.

The job computer, also designated as electronic control unit (ECU) can usually acquire and administer on the machine side a plurality of machine parameters of individual machine functions and optionally suitably transmit them to relevant actuators for the purpose of controlling the machine functions. Since now only interrupts in the network of the implement preferably configured as a bus system are transmitted by a hardware unit, the number of interrupts is reduced. As a result, the system can be operated more efficiently which in particular in the case of a large number of machine functions and their distributed representation on a plurality of universal terminals brings about an improved performance compared with machine functions which are each imaged via their own job computers on individual universal terminals of the same network. The network of the implement at least comprises the job computer and the connection to the universal terminals and these terminals themselves, which are equally authorized with respect to one another. The universal terminals according to the invention are equally authorized in such a manner that in particular with regard to their bus addresses, they can be arbitrarily exchanged for one another and/or if one universal terminal is removed, it is still possible to use the or the further universal terminals. The configuration of the universal terminals according to the invention can be undertaken from any universal terminal and the configuration of any display surfaces of a universal terminal and/or in particular, the interpretation of any inputs on a respective display surface is accomplished in this respect independently of the respective universal terminal on the job computer.

The appurtenant interface of the job computer, which in particular is configured as an ISOBUS interface allows the connection of the job computer to the universal terminals, wherein this can be a wireless and/or wired connection.

The imaging of the machine parameters on the universal terminal comprises, on the one hand, the pure representation of the machine parameters on the display of the universal terminal. However, it can on the other hand also comprise a display of handled or processed information in depictable size as machine parameters. A simultaneous representation is a representation in which the respective machine parameters are present simultaneously on adjacently arranged universal terminals for the human eye notwithstanding any image repetition frequencies. The displays are preferably configured as touch displays so that any input surfaces on the display are implemented themselves.

Preferably the network is configured as an ISOBUS network and thus in accordance with the ISOBUS Standard ISO11783. It is understood that the job computer for this is equipped accordingly both on the hardware side and on the software side. The necessary means comprise in particular an operating or control software for handling and optionally processing the information obtained from the individual machine functions in the form of machine parameters. This software controls, for example, sensor enquiries and contains control algorithms for actuation and control of actuators on the implement side. Furthermore, a graphical user interface (GUI) is implemented which is configured for controlling the universal terminal. Further means comprise inputs and/or outputs for the evaluation of sensors and for the actuation of actuators, one or more microcontrollers, memories (in the form of RAM or ROM memories) as well as one or more network interfaces (CAN, LIN, Ethernet, MOST and/or FlexRay).

The invention is then advantageously further developed if input surfaces are assigned to the machine parameter, in particular shortly after the system start, on the at least two universal terminals, via which the machine parameter can be varied by both universal terminals. Thus, it is not only possible to reproduce the machine parameter and monitor an accordingly appurtenant machine function on two different terminals simultaneously but with actively controllable machine functions or with machine parameters to be regulated accordingly, these can be varied by both terminals. It is therefore possible to operate identical machine functions from several terminals.

This is particularly advantageous for complex pulled agricultural implements, for example, root crop harvesters, in particular potato harvesters in which universal terminals can be arranged at a distance from one another both on the tractor side and on the sorting table side and by which identical machine functions can be set. Thus, both a tractor driver and operating staff on the implement itself can operate identical machine functions.

Advantageously a configuration of the input surfaces on the universal terminal is made by means of a configuration assistant executed on the job computer which is started upon identification of an unknown universal terminal and in particular automatically or can be started by a user.

The configuration assistant is a computer program or a part of a computer program executed on the job computer or implemented software system and can in particular also be retrieved subsequently, namely when the user interfaces of the universal terminal are to be changed. Thus, for example, a plurality of operators of various agricultural implements can each take with them their universal terminal, each characterized via a UID (unique identifier) in order to retrieve a specific configuration of the user interface of the universal terminal acting as man-machine interface depending on the agricultural implement and the UID of the terminal. Accordingly, it is particularly advantageous if the configuration of the universal terminal is stored as a profile on the job computer so that a configuration possibility or a suitable profile is started automatically after identification of the universal terminal connected at the job computer or connected to this. The configuration of the universal terminal is thus made on the side of the job computer which can identify respective universal terminals and represents the configuration assistant on one or more of the universal terminals which, according to the invention, are in particular at least initially equally authorized.

In particular, for service or other privileged operating staff, the configuration assistant can comprise different levels and levels which cannot be reached by a simple user, which are in part secured via a log-in mask with password input. By this means, special machine functions which can more easily result in incorrect operation and critical implement states can be secured.

Preferably a plurality of configurations in the form of profiles are stored on the job computer, of which one is loaded depending on the universal terminal connected to the job computer after a system start or after an exchange of a universal terminal. Such an exchange can also take place during running operation of the software and the implement. For this purpose, at intervals, in particular at regular intervals, the unique identifiers of the universal terminals present in the network are checked on the job computer side. Upon identification of an unknown UID, the configuration assistant can then be started. In the case of several possible configurations of known universal terminals, in the case of a re-start of the system or with a new combination of known devices, the operator can either be offered a selection possibility on the user interface of the two universal terminals or after a re-start, the last active configuration will be selected. Thus, for example, upon identifying a number of more than two universal terminals according to configuration, only one subgroup from the total universal terminals present can be operated. For security purposes, a password input can be run through to retrieve a configuration so that the configuration of the at least two universal terminals once performed cannot easily be changed. As a result of the method according to the invention, a simple tractor-dependent configuration of the machine operation is therefore possible if different universal terminals are present on the respective tractors.

Advantageously, after the influence of a machine parameter and therefore a machine function via one of the universal terminals, the image of the machine parameter on the further universal terminal or terminals is adapted. Accordingly, the software present on the job computer is able to reproduce the change brought about by an input directly on other universal terminals as well, which is advantageous for the operation at different locations on tractor and implement.

In a further development according to the invention in which at least one machine parameter and therefore one machine function of the implement is set and/or controlled, in order to avoid simultaneous variations of a machine parameter at different universal terminals, at the beginning of an input on a first of the universal terminals an input on the second universal terminal is blocked on the software side. This blocking is in particular accomplished by software technology to the effect that inputs on the then blocked universal terminal either are not accepted or not taken into account. Accordingly, a graphical indication can be given that the input is not possible as a result of a further input on another universal terminal.

Additionally or alternatively it is advantageous if upon detection of a critical value of a machine parameter on at least the two universal terminals an alarm message is displayed. This is particularly advantageous for fault messages for important machine functions. Thus, in critical operating states a reaction, such as, for example, the influencing of the appurtenant machine parameter, can be accomplished by whichever universal terminal.

Furthermore, it is advantageous if, according to a further advantageous configuration, the job computer communicates with the universal terminal by means of a single address preferably configured as an ISOBUS address, which reduces the number of interrupts. Alternatively, when using a single job computer, a plurality of addresses configured in particular as ISOBUS addresses are implemented in the form of working sets or virtual clients on this job computer so that the individual universal terminals can be actuated from the job computer with different addresses. Preferably the number of addresses configured in particular as ISOBUS addresses corresponds to the number of the universal terminals.

According to a further configuration of the invention according to the invention, the first universal terminal is actuated by the job computer located in the same housing and is communicated to the second universal terminal (8) connected in particular in a cableless and/or wireless manner in a bus-bound manner. A bus-bound communication is a communication by means of a bus system, e.g., by means of ISOBUS. Such an arrangement can be advantageous for harvesting machines according to the invention, in particular if no bus connection is required in the same housing but a job computer can directly actuate a universal terminal, for example, by board-side connection. This then facilitates communication in the further network since bus addresses need not necessarily be used. However, in a universal terminal arranged in the same housing, a bus connection to a job computer arranged in the same housing can be provided, which then leads to saving in the area of the housing.

The initially formulated object is also achieved by an arrangement comprising an agricultural implement, wherein the implement is in particular configured as an implement pulled by a tractor or a self-propelled implement, wherein the implement comprises a job computer arranged on the implement. The job computer is then arranged on the implement when it is arranged on or in the implement and thus in particular is physically connected to the implement. Furthermore, such an arrangement comprises at least two equally authorized universal terminals to be connected via an interface of the job computer. These can be connected in a wireless or cabled manner as described previously. An arrangement according to the invention is characterized by a configuration for carrying out a previously or subsequently described method according to the invention. Such a configuration is then given if means are provided which are suitable for carrying out the steps of a method according to the invention. An arrangement according to the invention thus comprises both hardware-side means and also software-side means which are implemented on the hardware.

Furthermore, in one exemplary embodiment according to the invention, both the job computer and also the two universal terminals are provided with their own housings. In this respect, the arrangement of the components which are actuated via the method according to the invention is free. In a configuration of the arrangement according to the invention which aims at a more compact design, it can also be advantageous to arrange the job computer and the first universal terminal in a common housing, wherein the second universal terminal is arranged at a distance therefrom and in particular in its own housing.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Individual technical features of the subsequently described exemplary embodiments can also be combined in combination with previously described exemplary embodiments and the features of the independent claims and any further claims to form subject matters according to the invention. Insofar as is appropriate, elements having functionally the same effect at least in parts are provided with identical reference numbers.

An arrangement according to the invention comprises an agricultural implement which in the present case is configured as a potato harvester pulled by a tractor 2. Individual parts of the arrangement are shown schematically in FIG. 1 above the tractor 2 and implement 1. A dashed line 3 indicates the assignment of individual parts to the implement 1 and the tractor 2.

Figure 1:
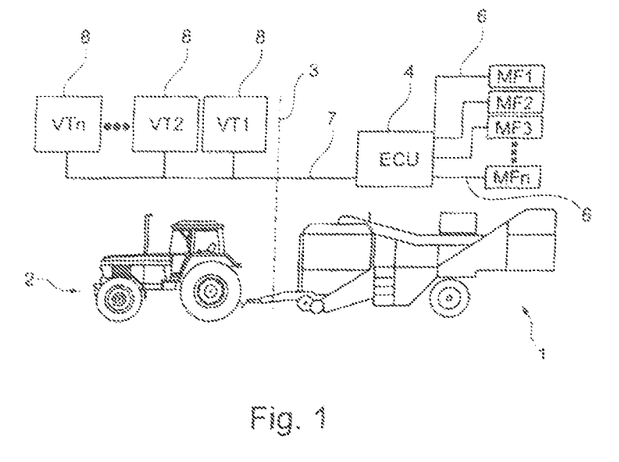
FIG. 1 shows a schematic diagram of an arrangement according to the invention.

A job computer 4 is arranged on the potato harvester. This job computer 4 administers machine parameters which are used to control or monitor a plurality of machine functions MF1 to MFn. One machine function is, for example, an adjustability of a hydraulic pump or the conveying speed of a conveyor belt brought about by this. A machine function can, for example, also be implemented in the monitoring of angular positions of specific machine parts by sensors, in actuators for actuating valves or other functional parts of a potato harvester. The sensors, adjusting means, etc. are connected via data lines 6 to appurtenant inputs and outputs on the job computer 4.

Via an interface integrated in the job computer 4, universal terminals 8 provided on the tractor 2, designated by VT1 to VTn to distinguish them, are connected. The universal terminals 8 each have their own ISOBUS address in the present case and are connected to a data line 7 provided for connection to the job computer 4. This is con figured as an ISOBUS data line 7 and connects to an interface provided on the job computer 4.

Figure 2:
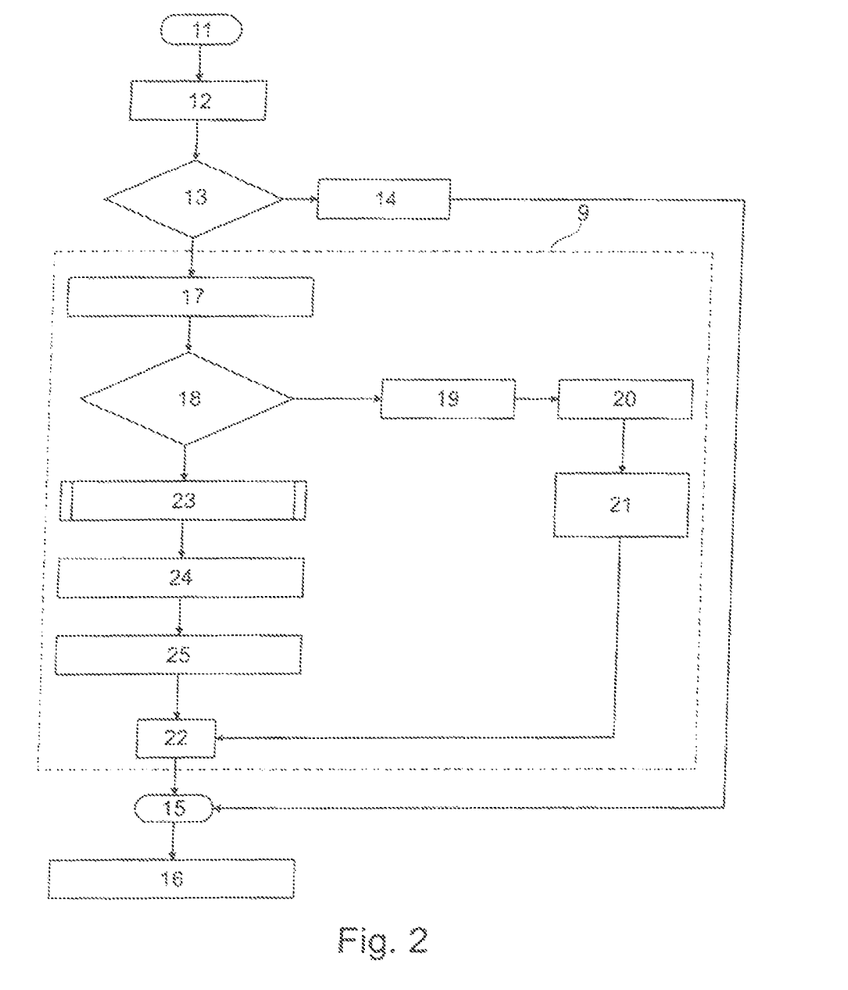
FIG. 2 shows a sequence of a method according to the invention.

A process sequence according to the invention is shown in sections in FIG. 2. An essential part of the representation is a configuration phase numbered generally as 9 which comprises steps provided in the dashed block. Beginning with a re-start 11 of the system, outside the configuration phase 9 used for unknown universal terminals the available universal terminals are initially detected by a configuration assistant in step 12. This configuration assistant is not only active at the beginning of the system start. On the contrary, this also detects an unplugging or plugging on and connection of a universal terminal 8 with the job computer 4 which occurs during operation.

In the course of checking the configuration assistant, in step 13 it is checked whether the addresses or designations of the universal terminal present in the network and configured in particular ISOBUS addresses are already known, i.e. are the subject matter of a configuration stored in a memory.

Hall the connected terminals are already known, in step 14 the profile is loaded with the last used configuration of the universal terminal 8 and the configuration assistant is then ended in step 15. In step 16 the machine parameters are then represented on the universal terminal 8, wherein at least one machine parameter is imaged simultaneously on two universal terminals 8.

If at least one of the universal terminal addresses is still unknown, i.e. are not the subject of an already stored profile, a graphical user interface of the configuration assistant is preferably displayed on all the universal terminals (step 17). Then in step 18 the user is offered an option for a single-terminal strategy or a multi-terminal strategy. If the single-terminal strategy is selected, in step 19 initially that universal terminal is selected on which the machine parameters are to be displayed. Then in step 20 only this terminal is actuated. Furthermore, in step 21 the surface of the universal terminal is configured. In step 22 this configuration is stored as a newly created profile wherein both the universal terminal used and the unused universal terminal are stored in the profile. This step 22 also takes place when a multi-terminal strategy is selected. In this case, the user initially selects those universal terminals which he would like to use (step 23). Then, only the universal terminals which were selected for the multi-terminal strategy are used (step 24). This can also comprise a subgroup of all the available terminals.

In step 25 the configuration of the universal terminal is made and the surface of the universal terminal is adapted for the machine parameters to be represented, wherein at least one machine parameter is represented on two terminals. On the basis of this configuration, a profile is then created, wherein now again those universal terminals which are not used are incorporated in the profile. This profile is then stored in step 22 and the configuration assistant is ended in step 15, whereupon control operation starts in step 16.

Figure 3:
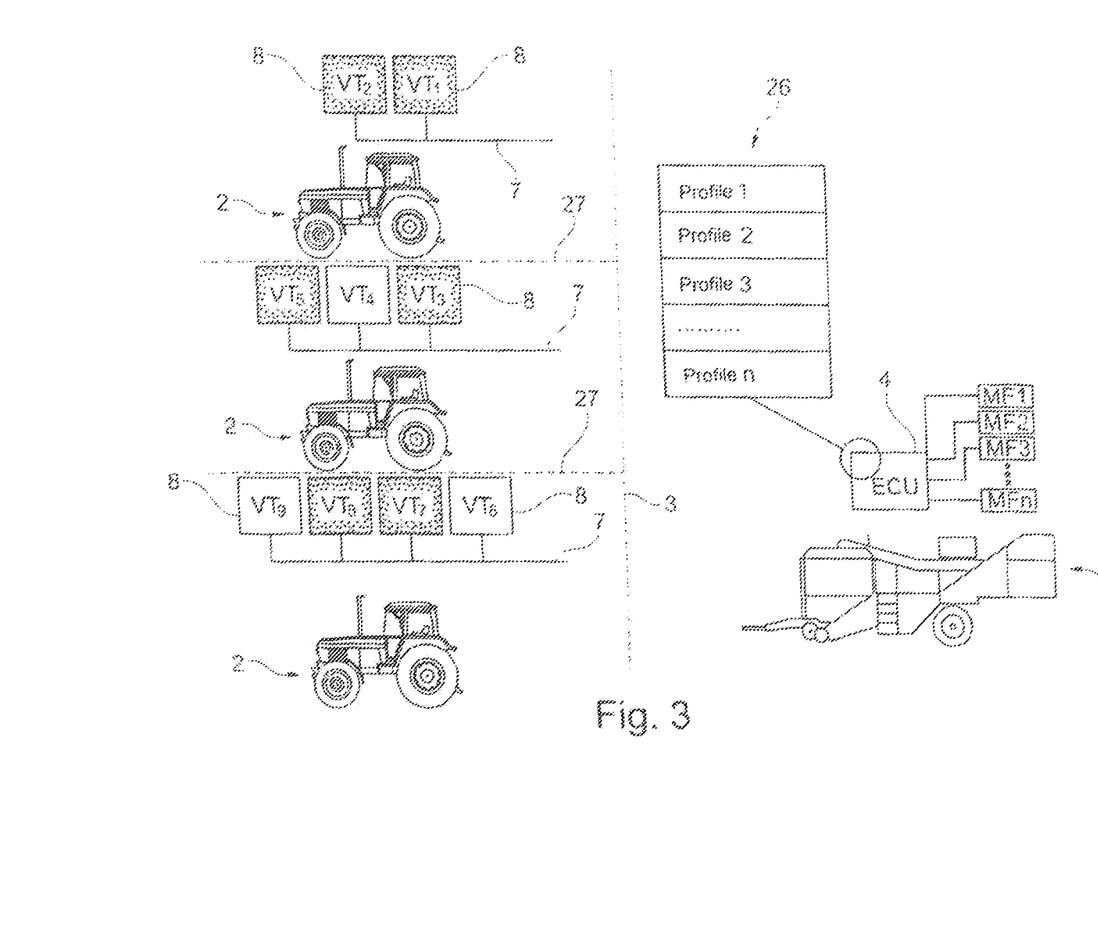
FIG. 3 shows exemplary embodiments of an arrangement according to the invention.

The use of several configurations over different profiles is illustrated in FIG. 3. Thus, according to FIG. 3, a multiplicity of n profiles (profile 1 to profile n) is stored in a memory 26 of the job computer 4. Separated again by a dashed line 3, the different configurations with a total of nine different universal terminals 8, characterized by VT1 to VT9, are imaged on a total of three different tractors 2. These universal terminals are therefore already known in the system of the job computer 4. Universal terminals 8 active during operation of the implement 1 are represented as a rectangle with dots whereas non-active universal terminals 8 are represented as rectangles not filled with dots. The three profiles located above one another are also separated from one another by means of dashed lines 27.

The uppermost profile 1 comprises an arrangement according to the invention with two universal terminals 8 which as VT1 and VT2 are both active during operation with the appurtenant tractor 2. Universal terminals 8, provided on a further tractor, which are designated by VT3, VT4 and VT5 are only active in parts. Terminal VT4 is not active. In profile 3 which comprises the universal terminals 8 designated by VT6, VT7, VT8 and VT9 on the further tractor 2 two non-active terminals designated by VT6 and VT9 are also present. These respective profiles are automatically loaded onto the respective tractor 2 after connecting the implement 1 in the case of a system start. As a result of the method according to the invention, a simple tractor-dependent configuration of the machine operation is therefore also possible, wherein the machine parameter of the respective machine function MF1 to MFn on both active universal terminals 8 are each assigned input surfaces for information relating to the state or for operation of the implement 1 when starting the system.

In the configuration phase 9 these input surfaces are defined for the unknown universal terminals 8. The respective configuration (profiles 1 to n) are stored on the job computer in the memory 26.

Figure 4:
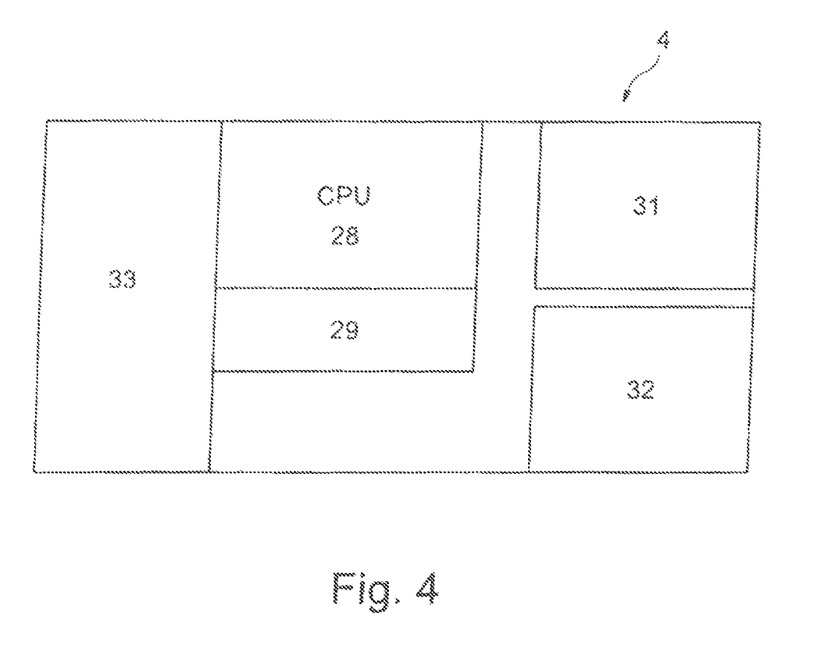
FIG. 4 shows a part of an arrangement according to the invention.

According to FIG. 4, a job computer of an arrangement according to the invention comprises a CPU 28 which is preferably assigned writable and only readable memory units 29. The memory 26 is part of these memory units 29. Furthermore, the job computer 4 has a plurality of inputs 31 for sensors as well as a plurality of out puts 32 for actuating the actuators of the implement 1. It is understood that the number of inputs and outputs 31, 32 can vary according to the implement and that an implement can be configured so that the necessary job computer 4 only has inputs 31.

One or more interfaces 33 based on CAN, LAN, MOST or other data communication means are provided for connection to various communication and data paths.

Figure 5:
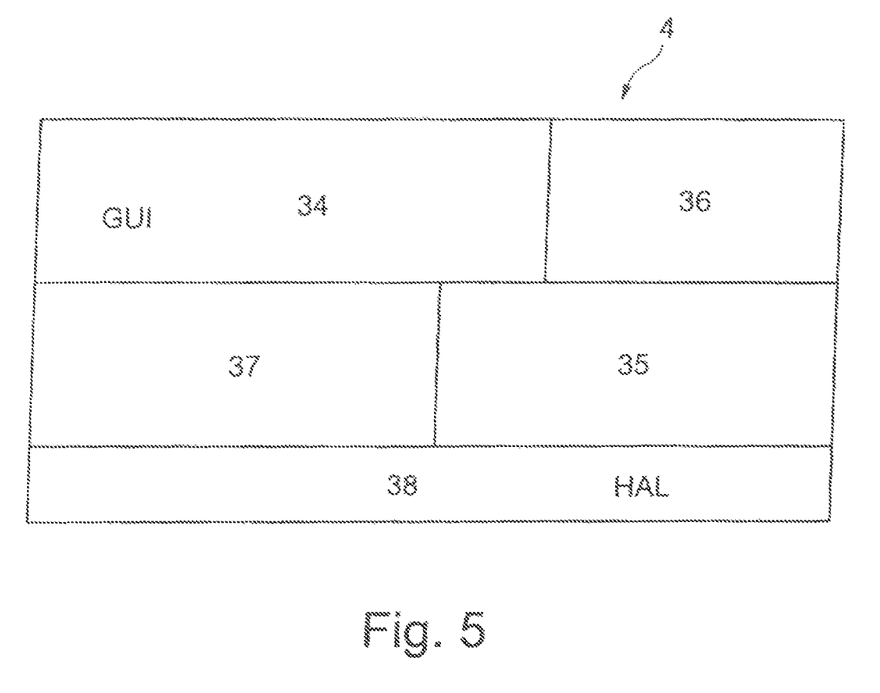
FIG. 5 shows a further part of an arrangement according to the invention.

The software-side structure according to FIG. 5 is assigned to the hardware-side structure according to FIG. 4. Accordingly, the hardware-side means are configured by using suitable software so that they are suitable for executing the method. The software equipment of the job computer 4 comprises a graphical user interface (GUI) 34 which as interface ensures communication with the universal terminals 8. For communication in the network and with the universal terminals, the graphical user interface 34 in particular uses the information provided by a driver module 35 preferably configured as an ISOBUS driver module. The driver module thus preferably provides a functionality in accordance with IS011783.

Furthermore, there is a configuration assistant 36 configured as an independent module or as a subroutine of a software for operation of the job computer, which implements the configuration of the universal terminals 8. The actuation and acceptance of the machine parameters of the respective machine functions of the implement 1 is accomplished via a main program 37 which provides the graphical user interface with the necessary data for representation on the universal terminals 8 or receives the parameters required to actuate the actuators from this interface.

The operation is based on a hardware abstraction layer 38 which enables access to the hardware.

Figure 6:
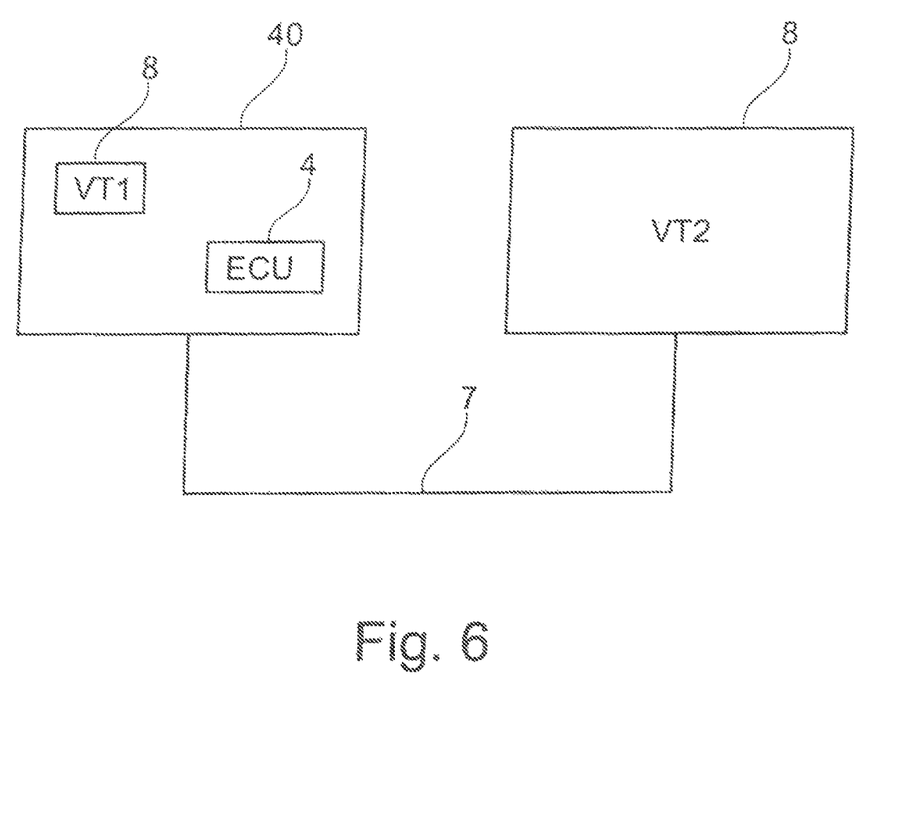
FIG. 6 shows a part of a further arrangement according to the invention.

According to the exemplary embodiment according to FIG. 6, the job computer (ECU, with a universal terminal 8, in the present case characterized as VT1, is arranged in its own housing 40 whereas the second universal terminal, in the present case characterized by VT2, is connected via a data line 7 in particular configured as an ISOBUS data line 7, in a cable-bound manner and therefore also in a bus-bound manner. For example, the housing 40 with the universal terminal 8 and the job computer 4 can be arranged on a root crop harvester, in particular a potato harvester, on the sorting table side whereas the universal terminal 8 characterized by VT2 is arranged on the tractor side, for example, in a driver's cab.

The invention claimed is:
1. A method for operating an agricultural implement comprising the steps of:
   administering, via at least one job computer arranged on the implement, one or more machine parameters relevant for the operation;

imaging the one or more machine parameters by means of an ISOBUS interface on a first of at least two universal terminals connected with the at least one job computer; and wherein the at least one machine parameter is imaged simultaneously on a second of the at least two universal terminals during operation;

wherein input surfaces are assigned to the one or more machine parameters on the at least two universal terminals via which the one or more machine parameters can be varied by both universal terminals;

and wherein the at least two universal terminals are equally authorized with respect to one another such that they are exchangeable for one another with respect to bus addresses of the respective at least two universal terminals.

2. The method according to claim 1, wherein a configuration of the input surfaces on the universal terminal is made by means of a configuration assistant executed on the at least one job computer which is started upon identification of an unknown universal terminal or can be started by a user.

3. The method according to claim 2, wherein the configuration of at least one of the at least two universal terminals is stored on the at least one job computer.

4. The method according to claim 3, wherein a plurality of configurations are stored on the at least one job computer, of which one is loaded depending on which of the at least two universal terminals connected to the at least one job computer after a system start or after an exchange of said universal terminal.

5. The method according to claim 4, wherein a password input is run through to configuration.

6. The method according to claim 1, wherein after the influence of a machine parameter via a said universal terminal, the image of the at least one machine parameter on the further universal terminal is adapted.

7. The method according to claim 1, wherein in order to avoid simultaneous variations of a machine parameter at different universal terminals, at the beginning of an input on a first of the universal terminals an input on the second universal terminal is blocked.

8. The method according to claim 1, wherein upon detection of a critical value of a machine parameter on at least the two universal terminals an alarm message is displayed.

9. The method according to claim 1, wherein the at least one job computer communicates with the at least two universal terminals by means of a single address configured as an ISOBUS address.

10. The method according to claim 1, wherein the job computer communicates with the universal terminal by means of more than one address configured as an ISOBUS address, wherein the number of addresses configured as ISOBUS addresses corresponds to the number of the universal terminals.

11. The method according to claim 1, wherein the first of the at least two universal terminals is actuated by the job computer located in the same housing and is communicated to the second of the at least two universal terminals in a bus-bound manner.

12. An arrangement comprising:
an agricultural implement;
a job computer arranged on the implement and comprising at least two universal terminals to be connected via an interface of the job computer, the job computer for carrying out a method of claim 1.

13. The arrangement according to claim 12, wherein the job computer and two universal terminals are provided with their own housings.

14. The arrangement according to claim 12, wherein the job computer and the first of the at least two universal terminals are arranged in a common housing and the second of the at least two universal terminals is arranged at a distance therefrom.

15. The method according to claim 1, wherein the agricultural implement is at least one of pulled by a tractor and a self-propelled implement.

16. The method according to claim 1, wherein the at least one machine parameter is imaged simultaneously on the second of the at least two universal terminals after an initial configuration phase during operation.

* * * * *

UNITED STATES PATENT AND TRADEMARK OFFICE
CERTIFICATE OF CORRECTION

| | |
|---|---|
| PATENT NO. | : 11,269,307 B2 |
| APPLICATION NO. | : 16/762533 |
| DATED | : March 8, 2022 |
| INVENTOR(S) | : Gustaaf Garrit Johan Van Zadelhoff, Torsten Napierala and Christoph Grothaus |

It is certified that error appears in the above-identified patent and that said Letters Patent is hereby corrected as shown below:

On the Title Page

In item (57), the Abstract:

In Column 2, Line 9, delete "dining" and replace with -- during --

In the Specification

In the Description:

In Column 7, Line 1, delete "Hall" and replace with -- If all --

Signed and Sealed this
Thirteenth Day of June, 2023

Katherine Kelly Vidal
*Director of the United States Patent and Trademark Office*